May 6, 1952      H. W. HAPMAN      2,595,941
CABLE-MOUNTED FLIGHT CONVEYER
Filed Sept. 4, 1948      2 SHEETS—SHEET 1
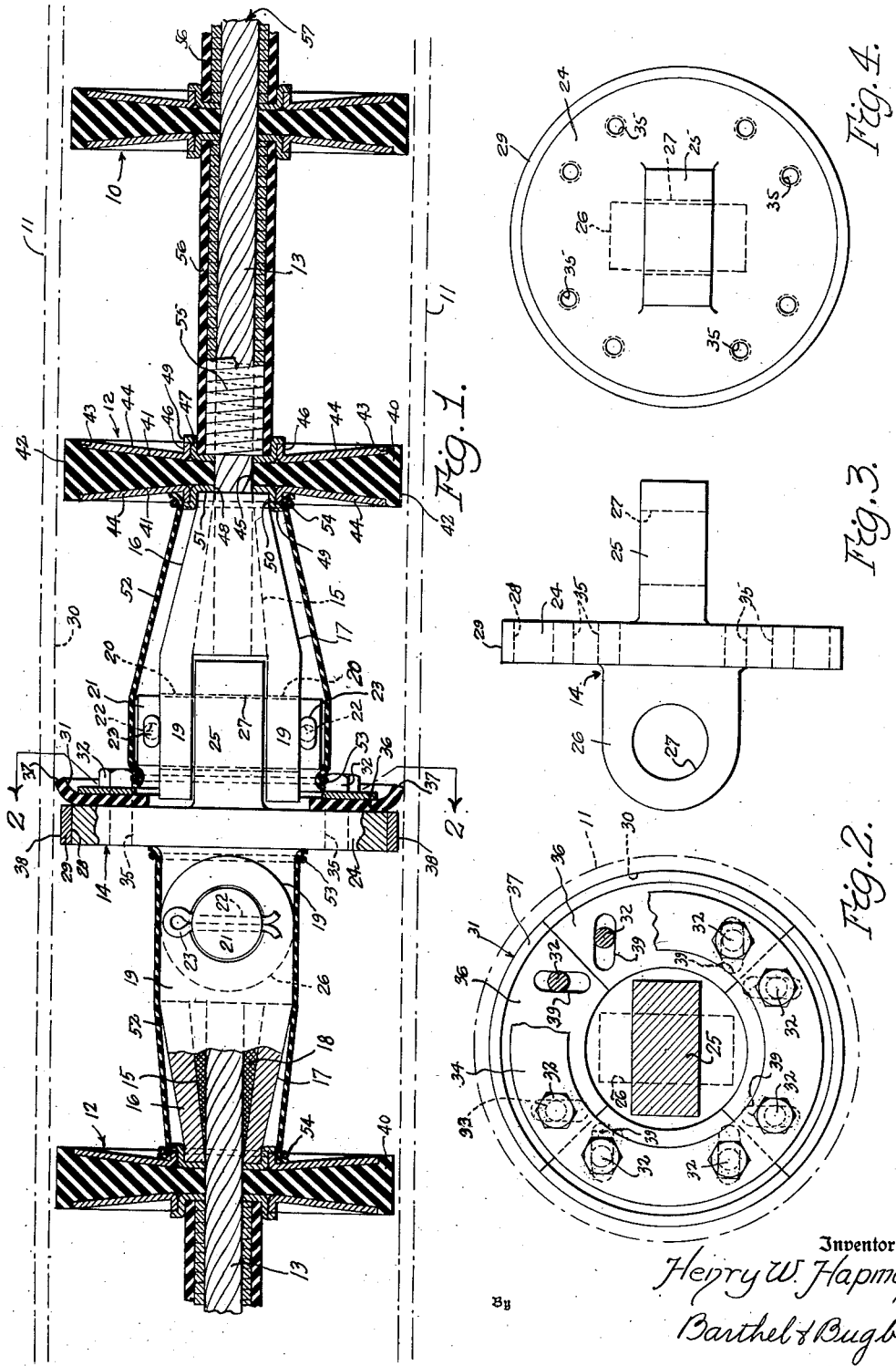
Inventor
Henry W. Hapman
By Barthel & Bugbee
Attorneys

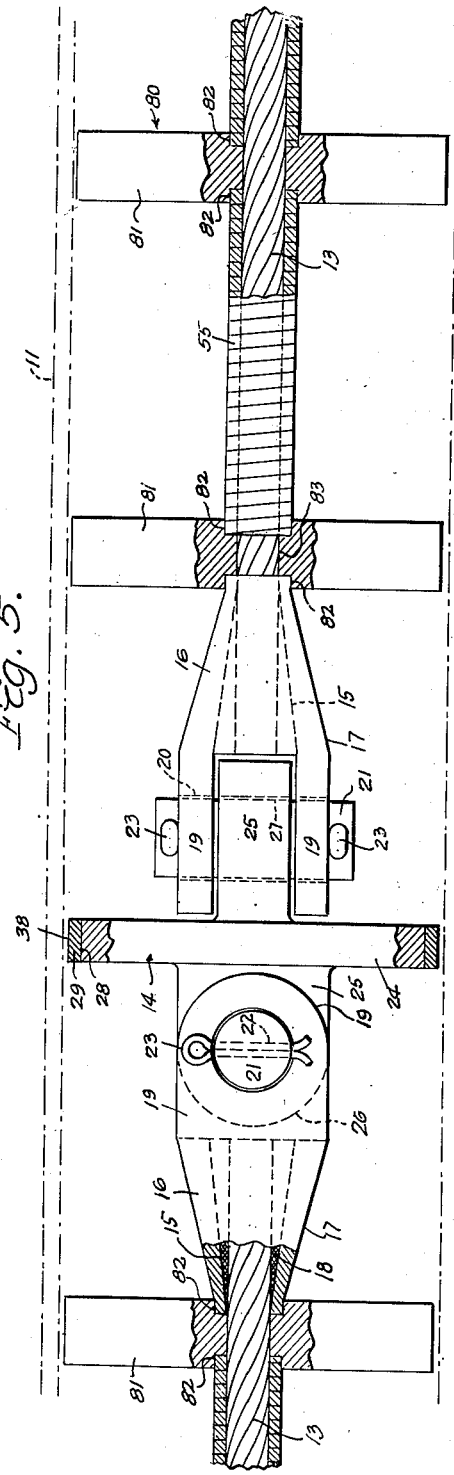
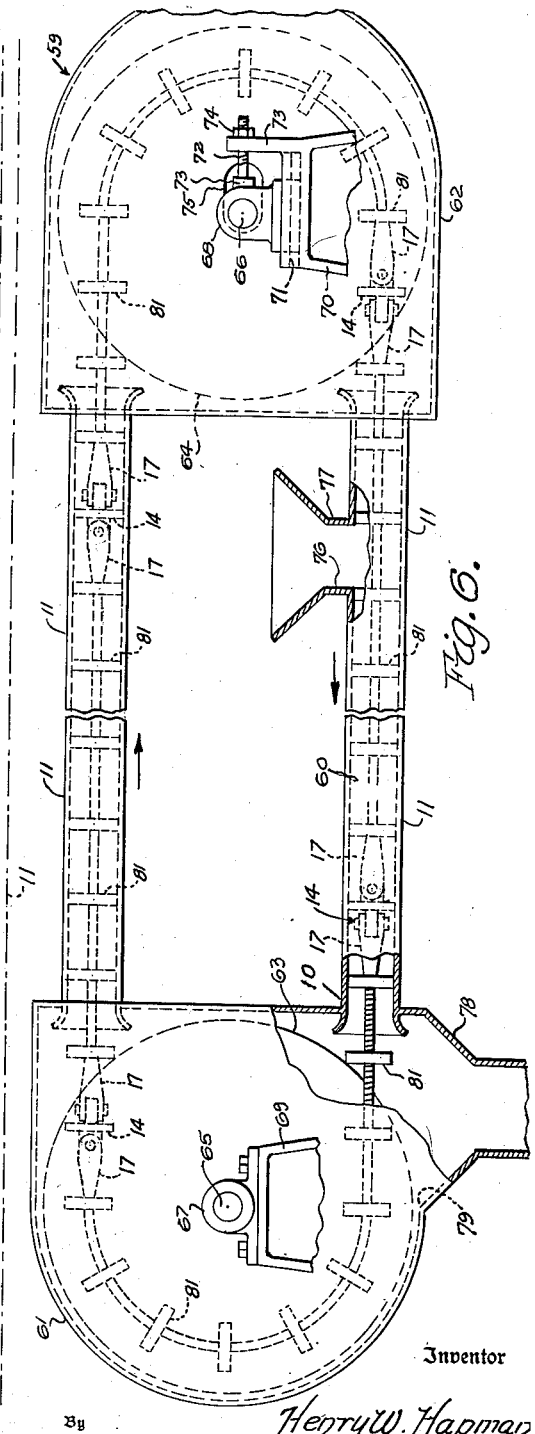

Patented May 6, 1952

2,595,941

UNITED STATES PATENT OFFICE 2,595,941

CABLE-MOUNTED FLIGHT CONVEYER

Henry W. Hapman, Detroit, Mich., assignor, by mesne assignments, of forty per cent to Hannah J. Hapman, Detroit, Mich.

Application September 4, 1948, Serial No. 47,913

13 Claims. (Cl. 198—168)

This invention relates to conveyors and, in particular, to flight conveyors of the cable type.

One object of this invention is to provide a cable-mounted flight conveyor having flights preferably of rubber-like material, wherein the cable between the flights is covered by springs and rubber-like sleeves extending between the flights and arranged in such a manner that the flights, which are loosely mounted on the cable, can move slightly along the cable so as to compensate for the stretch of the cable and still maintain the covering thereof.

Another object is to provide a cable-mounted flight conveyor of the foregoing character wherein the sleeves between the flights are slightly longer than the estimated distances between successive flights, so that both the springs and the sleeves must be slightly compressed during the assembly of the conveyor, thereby still further insuring that the cable will remain covered even though it stretches during use.

Another object is to provide a cable-mounted flight conveyor of the foregoing character wherein a predetermined number of flights are assembled, with their spacing springs and covering sleeves, on predetermined lengths of cable, having connectors at the end of each length whereby the successive lengths, which are coupled together to form an endless conveyor, distribute the stretch.

Another object is to provide a cable-mounted flight conveyor of the foregoing character wherein the couplings between successive lengths of cable are likewise covered with rubber-like material so that the conveyor as a whole is free from exposed pockets or crevices in which conveyed materials might lodge, thereby well adapting the conveyor for use in conveying food products, chemicals or other materials in which the lodging of such particles would be liable to cause decay, disease orf unsanitary conditions.

Another object is to provide a cable-mounted flight conveyor of the foregoing character wherein the connectors of successive lengths of cable have annular flanges which cause them likewise to serve as flights, these flanges being preferably encircled by bands of non-ferrous metal such as brass, so as to avoid the striking of sparks when the conveyor is mounted in a steel conduit, thereby preventing the danger of explosions which is frequently present in the conveyor of such materials as flour or grain.

Another object is to provide a cable-mounted flight conveyor of the type set forth in the object immediately preceding, wherein the connector flanges are also provided with peripheral wipers of disc form and of rubber-like material or, optionally of brush form or of spring steel or wire brush construction, these wipers being slightly larger in diameter than the flanges so as to project beyond the periphery thereof and reach out on a bend in the conveyor conduit, filling the space, as the flight is pulled toward the bend so as to scrape or wipe the conveyed material from the walls of the bend since the flight is normally pulled toward one side of the bend.

Another object is to provide a cable-mounted flight conveyor of the foregoing character which is especially well-adapted to travel at unusually high speeds and wherein the springs interconnecting the flights transmit the load from flight to flight to the connectors between successive lengths of cable, the cable itself at high speeds resisting bending and springing outward in making a turn—unlike a conveyor chain which by its limpness hugs the inner side of the bend.

In the drawings:

Figure 1 is a central longitudinal section through a cable-mounted flight conveyor, according to a preferred form of the invention, showing one of the connectors between successive lengths of cables;

Figure 2 is a cross-section along the line 2—2 in Figure 1, showing details of one of the cable connectors and the wiper associated therewith;

Figure 3 is a side elevation of a connector removed from the cable and its end clevises;

Figure 4 is a front or end elevation of the coupling shown in Figure 3;

Figure 5 is a side elevation, partly in central vertical section, of a portion of a modified cable-mounted flight conveyor adapted to withstand high temperatures and lacking the rubber-like protective coverings of the conveyor shown in Figures 1 to 4 inclusive; and Figure 6 is a side elevation, partly in vertical section, of a flight conveyor installation adapted to employ the conveyors shown in Figures 1 to 5 inclusive.

General arrangement

The conveying of the finely divided materials at high speeds by ordinary conveyors has hitherto presented serious problems, particularly where materials conveyed were of a perishable nature, such as flour, or other food products. Conveyor chains having flights mounted thereon frequently do not adapt themselves well to the rounding of bends in the conveyor conduit at high speed, since the conveyor chain by its limpness tends to hug the inner wall of the bend. Furthermore, the conveyor in rounding a bend often leaves material deposited on the walls at one side of the bend. Conveyor cable stretch is also a serious problem in previous conveyors, causing the cable to be exposed if the cable is covered by sleeves.

The present invention solves these problems by forming the conveyor in a series of separate lengths of cable interconnected by special couplings, thereby distributing the stretch between successive lengths of the conveyor and limiting the amount of motion of the flights due to this stretch. The flights themselves, which are preferably of rubber-like material, such as synthetic rubber, are loose upon the lengths of cable on which they are mounted, and are assembled between slightly compressed sleeves and helical springs. These springs, which are closed up, transmit the drive from one cable coupling to another. Wipers of rubber-like material, spring steel or wire brush material, are attached to flanges which project from the cable couplings to form flights in themselves, the couplings being surrounded by annular bands of brass or other non-ferrous metal, so that no sparks will be struck during the passage of the flight conveyor through a sealed conveyor conduit. This provides a high-speed flight conveyor having no exposed pockets or crevices in which food or other conveyed materials can lodge, and which brushes or scrapes off the conveyed material which would otherwise adhere to the walls of the conveyor conduit at bends therein.

*Conveyor construction*

Referring to the drawings in detail, Figure 1 shows a portion of a flight conveyor, generally designated 10, according to a preferred form of the invention, as mounted in a conduit 11 of steel or other suitable material. The conduit 11 may be arranged in any shape of path, depending upon the particular installation, as the invention is not limited to any specific path such as U-shaped, V-shaped or the like. It is contemplated that the conveyor 10 emerges from the conduit 11 for a short portion of its run so as to pass around resilient frictional driving devices such as are shown in the Hapman Patents Nos. 2,326,535 of August 10, 1943, and 2,333,926 of November 9, 1943. This type of driving mechanism as shown in these patents, unlike a chain conveyor, is independent of pitch, and the stretch of the cable makes no difference in the operation of the conveyor since it is automatically taken up by the driving mechanism shown therein.

The flight conveyor 10 consists generally of flights 12 loosely mounted on cables 13 which are connected to one another by connectors or couplings 14. The cables 13 are of predetermined length, such as, for example, ten or twelve feet, and are of any suitable material, such as steel wire laid in twisted strands in the usual manner. The ends of the cables 13 are inserted in the conical recesses 15 inside the ferrules 16 of the clevises 17, lead or other suitable material 18 being flowed into the recesses 15 in a molten condition to fill in the space between the wall of the recess 15 and the outer surface of the cable 13, as shown at the left-hand side of Figure 1. When the molten metal solidifies, the cable 13 is securely locked inside the ferrule 16. Each ferrule 16 has parallel arms 19 projecting forward from its end, these arms being provided with aligned bores 20 for receiving a pivot pin 21 having cross drilled holes 22 at its opposite ends for the reception of suitable fasteners, such as cotter pins 23.

The arms 19 of the clevises 17 of separate cable lengths 13 are interconnected by the couplings 14 through the pivot pins 21. The couplings 14 (Figures 3 and 4) are in the form of cast steel discs 24 having lugs 25 and 26 projecting from their opposite sides in planes at right angles to one another, the lugs 25 and 26 having bores 27 therein for the reception of the pivot pins 21.

It will be seen that the holes 20 and 27 in the clevis arm 19 and coupling lugs 26 are larger in diameter than the pivot pins 21 (Figure 1) so that a "sloppy fit" is obtained between them. This imparts a self-alignment between the parts which is very helpful during the operation of the conveyor, particularly as it passes around the driving pulley.

The arms 19 of the clevises 17 are of such spacing and the lugs 25 and 26 of such thicknesses that the two will fit closely together as shown in the central portion of Figure 1. Since the couplings 14 are ordinarily of ferrous metal, such as steel, for purposes of strength and low cost, their peripheral edges or rims 28 are preferably encircled by annular bands 29 of non-ferrous metal, such as brass. The bands 29 are preferably sweated on the rims 28 so as to be securely attached thereto, and serve to prevent the throwing off of sparks on contact with the inner walls of the conveyor conduit 11 during operation. This precaution minimizes the danger of explosions arising from such sparks when explosive or inflammable materials are being conveyed or the conveyor passes through atmosphere laden with explosive dust, vapor or gas.

The overall diameter of the coupling 14 including its brass band 29, is approximately the same as the diameters of the flights 12 so that the coupling also serves to some extent as a flight. In order to wipe, scrape or brush off conveyed material which otherwise would adhere to the inner walls 30 of the conduit 11, particularly in the vicinity of bends therein, the couplings 14 are provided with wiper or scraper units 31 secured thereto as by the bolts 32 passing through the holes 33 in annular washers 34 and threaded into threaded holes 35 (Figures 1 and 4) arranged in pairs near the periphery of the disc portion 24 of the couplings 14.

The wiper or scraper units 31 preferably consist of arcuate or quadrant shaped members 36 of rubber-like material, such as synthetic rubber, having their peripheral edges 37 arranged on larger diameters than the rim or periphery 38 of the brass band 29 forming the outer edge of the coupling disc 24. In this way, the wiper or scraper unit 31 projects beyond the edge of the coupling 14 (Figure 1) so as to engage and wipe or scrape off any material adhering to the inner wall of the conduit 11. The arcuate members 36 are provided with paired elongated slots 39 through which the shanks of the bolts 32 pass and which permits the arcuate members 36 to be moved outward or inward slightly in order to overcome or take up wear as well as to adjust the amount of force or friction with which the wiper unit 31 engages the conduit's inner wall 30. Under special conditions, such as in conveying unusually adherent or tenacious materials, such as, for example, zinc oxide, the wipers or scrapers 31 may optionally be made of spring steel or in the form of wire brushes. The harsher action of these metallic wipers or scrapers prevents the deposition of the zinc oxide which would otherwise coat the inside wall 30 of the conduit 11 with successive layers of material. The scrapers or wipers 31 by being mounted on the couplings 14, satisfactorily perform their wiping or scraping actions yet at the same time do not create the friction which would otherwise occur if the scrapers were mounted directly on the flights 12. The flights 12 under these circumstances, are made with a liberal clearance between their outer peripheries and the inner wall 30 of the conveyor conduit 11, such as a quarter inch difference in diameter for a six inch conveyor conduit. These clearances, however, are purely relative and may be varied according to the kind of material being conveyed or other conditions in the conveyor installation.

The flights 12 consist of discs 40, preferably of rubber-like material such as rubber or synthetic rubber, such material being known generically as elastic deformable material. The flight discs 40 preferably have inwardly dished or approximately conical side walls 41 having their outer edges spaced away from the peripheral surface 42 thereof and with a shoulder 43 defining their outer limits. The shoulders 43 serve to receive the outer edges of shallow dished or conical side plates or reinforcement members 44 which are bonded to the flight discs 40 during the molding process by which the latter are made. The flights 12 are cupped on their opposite sides in this manner to assist their carrying loads on vertical runs, such as in grain elevators. The centers of the flight discs 40 are provided with holes 45 which fit loosely over the cables 13 so as to be slidable therealong. There are no restrictions on the cables 13 except at the connectors or couplings 14 and not at any point in between these couplings 14.

The reinforcement members 44 are provided with central flanges 46 which snugly engage the outer walls of sockets or cups 47 which likewise have central holes 48 loosely fitting the cables 13. The sockets 47 are not bonded to the rubber-like flight discs 40, but may be inserted or removed at will. The sockets 47 have marginal flanges 49 which engage the edges of the flanges 46 on the reinforcement members 44, axial flanges 50 which are engaged by the flanges 46, and central walls 51 having the central holes 48 therein for the passage of the cables 13. In order to conceal the joints between the couplings 14 and the flights 12, tubular covers 52 of rubber-like material and elongated cross-section are stretched between the couplings 14 and the discs 12 and secured thereto by clamping rings 53 and 54 respectively. This construction prevents particles of the conveyed material from reaching the moving parts associated with the couplings 14, and thereby maintains the conveyor 10 in a sanitary condition.

In order to drivingly interconnect the various flights 12 between successive couplings 14, the flights 12 are spaced apart from one another by helical springs 55 preferably of square cross-section. These springs 55 likewise fit loosely over the cables 13 and are assembled in a slightly compressed condition between successive flights 12 so as to be able to expand to take up a certain amount of cable stretch. The opposite ends of the springs 55 are seated in the sockets 47, and are covered by sleeves 56 of rubber-like material, such as synthetic rubber, likewise seated in the sockets 47 between the springs 55 and flanges 50. The sleeves 56 are likewise assembled in a slightly compressed condition, like the springs 55, so as to expand when cable stretch occurs. It will be understood, however, that neither the flights 12 nor the springs 55 are clamped to the cables 13, but are capable of sliding slightly along the cables 13 as stretch occurs or as such self-alignment is called for under operating conditions.

The flight conveyor of this invention may be further protected from the action of corrosive foods, chemicals or other such materials by making the only exposed metal parts of stainless steel or other corrosive-resistant material or of coating or plating them with such a material. For example, the reinforcement members 44 of the flights 12, the retaining rings 54, the sockets 47, the couplings 14, the bolts 32 and washers 34 may be made of such corrosion-resistant material, and the brass rings or bands 29 may be omitted entirely except in conveying particles of material which involve an explosion hazard or where the conveyor passes through explosive materials or atmospheres.

*Conveyor operation*

In the operation of the invention, let it be assumed that the cables 13 have been connected in an endless path so that they form an endless flexible propelling unit 57 consisting of the cable lengths 13, couplings 14 and the clevises 17 as shown in Figure 1. Let it also be assumed that the flights 12 have been assembled on the conveyor cables 13 with the springs 55 and sleeves 56 in slightly compressed condition. Under these circumstances, the central walls 51 of the sockets 47 are pressed snugly up against the adjacent ends of the ferrules 16 of the clevises 17. When the driving mechanism is started, such as for example the driving mechanism shown in the Hapman Patents Nos. 2,326,535 and 2,333,926 referred to above, the flight conveyor 10 travels in an orbital path depending upon the path formed by the conveyor conduit 11. The driving mechanism frictionally engages the peripheries of the flights 12, the sockets 47 of which press upon either the ends of the ferrules 16 of the clevises 17 or upon the ends of the springs 55, transmitting the thrust to the coupling 14 which is ahead of the flights 12 being engaged by the driving mechanism. The fact that the springs 55 are of square cross-section gives an adequate bearing surface to transmit a heavy load. Thus, as each flight is engaged by the resilient pulley walls of the driving mechanism, the thrust is transmitted to the spring ahead of it and this, in turn, pushes against the flight ahead of that spring and so on until the thrust reaches the first coupling 14 ahead of the flights being engaged by the driving mechanism. The coupling, in turn, pulls on the cable length 13 connected to it, transferring the pull back to the coupling behind it and the flights being engaged by the driving pulley. The lengths of the cables 13 are such as to be long enough to have at least one length capable of passing entirely around the portion of the pulley engaged by the flights, and leaving a length to spare.

On a straightaway run of the conveyor, the springs 55 are required to sustain the load only of the material being conveyed. When each spring 55 reaches a pulley or a bend in the conduit, the spring convolutions are forced tightly together on the inside of the bend but expand slightly and separate slightly on the outside thereof, so as to traverse the bend successfully. Thus, on the inside of the bend, the spring 55 acts like a solid tube. The springs 55 prevent kinking which destroys ordinary cables, and maintain the cable in a taut condition, as well as to transmit the drive. Thus, the springs 55 ably occurs in the cable lengths 13, whereupon the flights 12 move slightly along the cable 13, making their own adjustment to the changed length of the cable between successive couplings 14. All cables stretch to some extent, especially in their early life and the present conveyor takes up this stretch as it occurs. As the conveyor goes around the drive pulley, the cables 13 make their own adjustment and pull outward, increasing the diameter of contact on the drive pulley. Moreover, the flights 12, springs 55 and spring covers 56 are also free to rotate on the cable lengths 13 so that there is no restriction whatever on the cable lengths except at their couplings 14.

In high speed operation, the cables 13 resist bending and tend to move outward in making a turn, unlike a conveyor chain, which by its limpness hugs the inner side of the bend. Thus, even though the wire springs 55 are closed tightly on their inner sides at the bends, they will still stretch around the turn but at the same time will always remain tight on a straight run of the conveyor. Moreover, the present conveyor not only occupies much less space than a bucket conveyor, but can be operated at a much higher speed without danger of breakdown.

Furthermore, as the couplings 14 traverse bends in the conveyor conduit 11, the wipers or scrapers 31 reach out and fill the space since the flight itself is pulled toward the bend. The wiping action is such as to wipe off or scrape off material which would otherwise collect at the bends. In this manner the food or other material conveyed finds no pockets in which to collect, hence the conveyor and its conduit are maintained in a completely sanitary condition. As wear occurs on the wipers or scrapers 31, they can be readjusted to engage the conduit walls as tightly as desired merely by loosening the bolts or screws 32 and moving the arcuate members 36 outward, retightening the bolts 32 when this has been accomplished. The conveyor is thus self-cleaning, operates at high speed and is independent of pitch changes or cable stretch. Since the cables 13 are in separate lengths, the stretch is confined to the individual lengths, rather than to a single length of cable forming the entire propelling unit 37, as in prior installations.

*Conveyor installation*

Figure 6 shows a typical flight conveyor installation in connection with which the flight conveyor of Figures 1 to 4 inclusive and the modified flight conveyor of Figure 5 described below, are adapted to be used. The flight conveyor installation generally designated 59 consists, in addition to the conduit 11, of a lower conduit 60 and end housings 61 and 62 containing the driving and idler pulleys 63 and 64 mounted on shafts 65 and 66 journaled in bearing brackets 67 and 68 mounted on supports 69 and 70. The supports 69 and 70 are, of course, mounted on the floor or upon beams or other portions of a building structure, the details of which are not involved in the present invention. The pulleys 63 and 64 are of the type disclosed and claimed in the Hapman Patent No. 2,326,535 of August 10, 1943, and hence require no detailed description. Power is applied to one of the shafts 65 or 66, preferably to the shaft 65, whereupon the rotation of the pulley 63 and its engagement with the flight conveyor 10 cause the latter to travel in an orbital path through the housings 61 and 62 and the conveyor conduits 11 and 60. The bearing bracket 67 is, for purposes of illustration, bolted to the support 69, whereas the bearing bracket 68 is slidably mounted in a grooved guideway 71 formed in the support 70 in order to provide means for taking up the slack in the conveyor 10. This is done by tightening or loosening adjusting screws 72 rotatably secured as at 73 to the bearing bracket 68 and passing through a bore in an arm 73 projecting upward from the support 70. Nuts 74 threaded upon the screws 72 serve to hold the latter and the bearing bracket 68 in their adjusted positions. An elongated slot 75 permits this adjustment of the shaft 66.

In order to fill the conduit 60 with material to be conveyed, the latter on its upper surface is supplied with an opening 76 to which a funnel-like inlet hopper 77 is connected. A funnel-like outlet hopper 78 is also connected and extends downward from an opening 79 in the bottom of the housing 62. Thus, if the pulleys 63 and 64 are rotated in a clockwise direction, the flight conveyor 10 in the lower conduit 60 will move from right to left, conveying material from the inlet hopper 77 through the conduit 60 and into the housing 62, where it drops off the conveyor 10 and drops downward through the outlet hopper 78 into any suitable receiver. It will be observed from Figure 6 that the conveyor installation 59 includes several lengths of the cables 13 and several of the couplings 14 interconnecting their adjacent ends. This construction confines the stretch of the cable to each length thereof and limits the amount that any one flight can travel along the cable.

*Solid uncovered flight conveyor*

The modified flight conveyor, generally designated 80, shown in Figure 5, is as regards the cable, the springs and the couplings, similar to the the principal forms of the invention shown in Figures 1 to 4, inclusive, hence similar parts are similarly designated. The modified conveyor 80, however, is adapted for use in conveying materials at high temperature where rubber would disintegrate or be seriously damaged. One typical installation, for example, is that of handling char, which is coal from which a portion of the volatile ingredients have been separated, but which has not been reduced to coke.

The modification of Figure 5 has solid flights 81 in place of the composite, partially synthetic rubber flights of Figure 1. The flights 81, for example, may be made of cast iron or other suitable material and have sockets or counterbores 82 at their central portions opening into bores 83 loosely receiving the cable 13. The ends of the springs 55 are received in the counterbores 82 in place of the sockets 47, which are omitted in this modification. The ends of the ferrules 16 are also received within the counterbores 82 of the adjacent flights 81.

The operation of the modified flight conveyor 80 is substantially the same as that of the principal form shown in Figures 1 to 4 inclusive, except that the working course of the conveyor 80 is arranged in a straight line as shown at the bottom of Figure 6. Without the covers 56 for the springs 55, conveyed material in powdered form would pack in the intervals between convolutions of the springs if these passed around bends in the conduit or around pulleys or sprockets while they were conveying such material. On a straightaway course, however, the convolutions of the springs 55 do not separate, hence no material can pack into these spaces as the springs are tightly coiled by overstressing them.

As before, the material to be conveyed is deposited in the inlet hopper 77 whence it drops through the hole 76 into the conduit 60 (Figure 6). Here it is picked up by the flights 81 as they are pulled along by the cables 13 through the action of the couplings 14 and springs 55, as explained in connection with the operation of the principal form of the invention. When the conveyed material reaches the left-hand end of the conduit 60, assuming the pulleys 63 and 64 to be driven in clockwise directions, the material drops out of the spaces between the flights 81 and passes down through the hole 79 into the discharge hopper 78 and thence into a suitable receiver. Thus, the flights are freed from the conveyed material as they pass around the pulleys 63 and 64, hence either the spring sleeves 56 or the covers 52 can safely be omitted in this modification when installed as shown in Figure 6.

What I claim is:

1. A flight conveyor comprising a plurality of cable couplings, a plurality of cables attached at their ends to said couplings, a multiplicity of flights loosely and slidably mounted on said cables and having sockets therein, and helical springs mounted on said cables between said flights with their ends disposed in said sockets.

2. A flight conveyor comprising a plurality of cable couplings, a plurality of cables attached at their ends to said couplings, a multiplicity of flights loosely and slidably mounted on said cables and having sockets therein, helical springs mounted on said cables between said flights with their ends disposed in said sockets, and tubular covers of elastic material mounted on said springs and extending between said flights.

3. A flight conveyor comprising a plurality of cable couplings, a plurality of cables attached at their ends to said couplings, a multiplicity of flights loosely and slidably mounted on said cables and having sockets therein, and helical springs mounted on said cables between said flights with their ends disposed in said sockets, the convolutions of said springs being disposed closely adjacent one another substantially in engagement with one another.

4. A flight conveyor comprising a plurality of cable couplings, a plurality of cables attached at their ends to said couplings, a multiplicity of flights loosely and slidably mounted on said cables and having sockets therein, and helical springs of approximately rectangular cross-section mounted on said cables between said flights with their ends disposed in said sockets.

5. A flight conveyor comprising a plurality of cable couplings, a plurality of cables attached at their ends to said couplings, a multiplicity of flights loosely and slidably mounted on said cables and having sockets therein, and helical springs mounted on said cables between said flights with their ends disposed in said sockets, said couplings having disc portions and peripheral bands thereon of non-ferrous metal.

6. A flight conveyor comprising a plurality of cable couplings, a plurality of cables attached at their ends to said couplings, a multiplicity of flights loosely and slidably mounted on said cables, and helical springs mounted on said cables between said flights, said couplings having disc portions thereon of approximately the same diameters as said flights, said couplings having wipers attached thereto and extending transversely outward beyond said disc portions, said wipers including arcuate portions assembled end to end in an annular path and adjustable radially relatively to said disc portions.

7. A flight conveyor comprising a plurality of cable couplings, a plurality of cables attached at their ends to said couplings, a multiplicity of flights loosely and slidably mounted on said cables, helical springs mounted on said cables between said flights, tubular covers of elastic material mounted on said springs and extending between said flights, and tubular hoods mounted over said couplings and concealing parts thereof.

8. A flight conveyor comprising a plurality of cable couplings, a plurality of cables attached at their ends to said couplings, a multiplicity of flights of elastic deformable material and having concave opposite sides loosely and slidably mounted on said cables, dished side plates disposed in mating engagement with said concave opposite sides of said flights, and helical springs mounted on said cables between said flights.

9. A flight conveyor comprising a plurality of cable couplings, a plurality of cables attached at their ends to said couplings, a multiplicity of flights of elastic deformable material and having concave opposite sides loosely and slidably mounted on said cables, dished side plates disposed in mating engagement with said concave opposite sides of said flights, said side plates having annular flanges extending axially therefrom along said cables, and helical springs mounted on said cables between said flights.

10. A flight conveyor comprising a plurality of cable couplings, a plurality of cables attached at their ends to said couplings, a multiplicity of flights of elastic deformable material and having concave opposite sides loosely and slidably mounted on said cables, dished side plates disposed in mating engagement with said concave opposite sides of said flights, helical springs mounted on said cables between said flights, and sockets disposed on the opposite sides of said flights, the ends of said springs being seated in said sockets.

11. A flight conveyor installation comprising a plurality of cable couplings, a plurality of cables attached at their ends to said couplings and arranged in series to form an endless cable assembly, a multiplicity of flights loosely and slidably mounted on each of said cables and having sockets therein, helical springs mounted on said cables between said flights with their ends disposed in said sockets, and a driving wheel drivingly engaging said flights to move said flights and said cables in an orbital path.

12. A flight conveyor comprising a plurality of cable couplings, a plurality of cables attached at their ends to said couplings, a multiplicity of flights of heat-resisting material loosely and slidably mounted on said cables and having sockets therein, and helical springs mounted on said cables between said flights with their ends disposed in said sockets.

13. A flight conveyor comprising a plurality of cable couplings, a plurality of cables attached at their ends to said couplings, a multiplicity of flights of heat-resisting material loosely and slidably mounted on said cables, and helical springs mounted on said cables between said flights, said flights having recesses in the central portions thereof receiving the ends of said springs.

HENRY W. HAPMAN.

REFERENCES CITED

The following references are of record in the file of this patent:

UNITED STATES PATENTS

| Number | Name | Date |
| --- | --- | --- |
| 499,525 | Dodge | June 13, 1893 |
| 747,160 | Garland | Dec. 15, 1903 |
| 833,141 | Van Nouhuys | Oct. 9, 1906 |
| 1,732,277 | Owens | Oct. 22, 1929 |
| 2,110,204 | Davis | Mar. 8, 1938 |
| 2,326,535 | Hapman | Aug. 10, 1943 |